(12) United States Patent
Imamura et al.

(10) Patent No.: US 12,351,023 B2
(45) Date of Patent: Jul. 8, 2025

(54) DISPLAY DEVICE

(71) Applicant: Panasonic Intellectual Property Management Co., Ltd., Osaka (JP)

(72) Inventors: Norihiro Imamura, Osaka (JP); Kenji Nagatomi, Osaka (JP); Hirofumi Hoshida, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 418 days.

(21) Appl. No.: 17/849,210

(22) Filed: Jun. 24, 2022

(65) Prior Publication Data
US 2023/0001791 A1    Jan. 5, 2023

(30) Foreign Application Priority Data

Jun. 30, 2021 (JP) .................. 2021-108849
Dec. 2, 2021 (JP) .................. 2021-196547

(51) Int. Cl.
*B60K 35/00* (2024.01)
*B60K 35/23* (2024.01)
*G02B 27/01* (2006.01)

(52) U.S. Cl.
CPC .......... *B60K 35/00* (2013.01); *G02B 27/0101* (2013.01); *B60K 35/23* (2024.01)

(58) Field of Classification Search
CPC ... G02B 27/01–0189; G02B 2027/0105–0198; B60K 35/00–90
See application file for complete search history.

(56) References Cited

U.S. PATENT DOCUMENTS

| | | | | |
|---|---|---|---|---|
| 5,777,794 A | * | 7/1998 | Nakaoka | G02B 27/0172 |
| | | | | 359/632 |
| 2016/0366380 A1 | * | 12/2016 | Okamoto | H04N 9/3164 |
| 2020/0201037 A1 | * | 6/2020 | Yamamoto | G02B 27/283 |
| 2021/0382304 A1 | * | 12/2021 | You | G02B 3/00 |

FOREIGN PATENT DOCUMENTS

JP    2017-210229    11/2017

* cited by examiner

*Primary Examiner* — Christopher A Lamb, II
(74) *Attorney, Agent, or Firm* — Greenblum & Bernstein, P.L.C.

(57) ABSTRACT

A display device includes: a display; an optical element including a first surface and a second surface; and a reflective member provided on the second surface. The first surface is a convex cylindrical surface whose axial direction is a first direction (parallel to the X axis), allows light emitted from the display to enter, and allows the light reflected by the reflective member to exit. The second surface is a convex cylindrical surface whose axial direction is a second direction (parallel to the Y axis) orthogonal to the first direction. The reflective member includes a reflective surface that reflects the light that has entered from the first surface toward the first surface. The reflective surface is a concave cylindrical surface whose axial direction is the second direction.

9 Claims, 8 Drawing Sheets

DISPLAY DEVICE

CROSS REFERENCE TO RELATED APPLICATIONS

The present application is based on and claims priority of Japanese Patent Application No. 2021-108849 filed on Jun. 30, 2021, and Japanese Patent Application No. 2021-196547 filed on Dec. 2, 2021.

FIELD

The present disclosure relates to a display device.

BACKGROUND

Display devices for displaying images have been conventionally known. For instance, Patent Literature (PTL) 1 discloses, as one example of the display devices, a display device that includes a display, a half mirror that reflects an image displayed on the display, and a concave mirror that reflects the image reflected by the half mirror.

CITATION LIST

Patent Literature

PTL 1: Japanese Unexamined Patent Application Publication No. 2017-210229

SUMMARY

However, the display device according to PTL 1 can be improved upon.

In view of this, the present disclosure provides a display device capable of improving upon the above related art.

A display device according to one aspect of the present disclosure includes: a display; an optical element including a first surface and a second surface; and a reflective member provided on the second surface. The first surface is a convex cylindrical surface whose axial direction is a first direction, allows light emitted from the display to enter, and allows the light reflected by the reflective member to exit. The second surface is a convex cylindrical surface whose axial direction is a second direction orthogonal to the first direction. The reflective member includes a reflective surface that reflects the light that has entered from the first surface toward the first surface. The reflective surface is a concave cylindrical surface whose axial direction is the second direction.

A display device according to one aspect of the present disclosure can improve upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
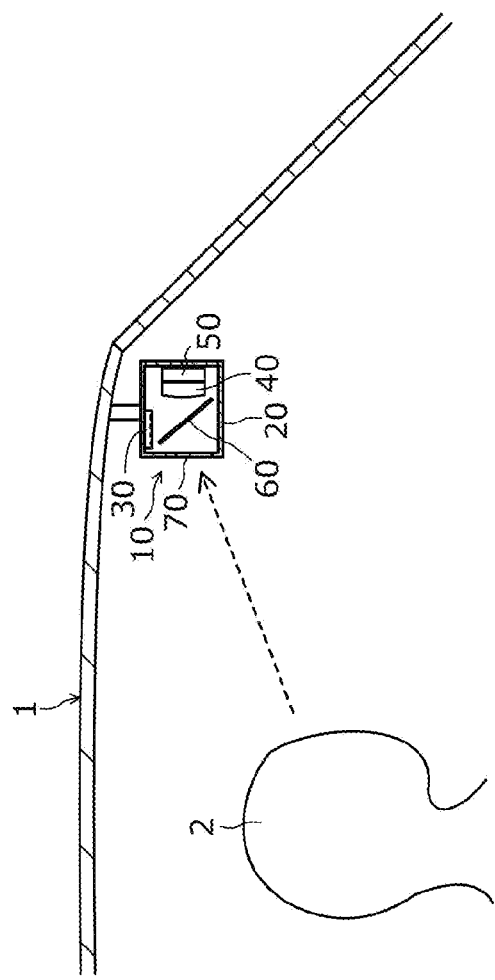
FIG. 1 is a diagram illustrating a state in which a display device according to Embodiment 1 is provided in a vehicle.

A display device according to one aspect of the present disclosure includes: a display; an optical element including a first surface and a second surface; and a reflective member provided on the second surface. The first surface is a convex cylindrical surface whose axial direction is a first direction, allows light emitted from the display to enter, and allows the light reflected by the reflective member to exit. The second surface is a convex cylindrical surface whose axial direction is a second direction orthogonal to the first direction. The reflective member includes a reflective surface that reflects the light that has entered from the first surface toward the first surface. The reflective surface is a concave cylindrical surface whose axial direction is the second direction.

With this, since (i) the first surface is a convex cylindrical surface whose axial direction is the first direction and (ii) the reflective surface is a concave cylindrical surface whose axial direction is the second direction orthogonal to the first direction, it is possible to prevent light that has entered from the first surface, has reflected by the reflective surface, and has exited from the first surface from being focused at one point. Accordingly, an increase in the temperature in a focal area can be reduced.

In addition, the display device may further include a half mirror that reflects the light emitted from the display toward the first surface, and allows the light exited from the first surface to pass through.

With this, it is possible to increase an optical path length by causing light emitted from the display to enter from the first surface after the light is reflected by the half mirror. Accordingly, a driver, etc. can visually check an image displayed on the display at a greater distance.

In addition, a dimension of the first surface in the first direction may be greater than a dimension of the second surface in the second direction.

With this, it is possible to readily display a long-shaped image, while reducing an increase in the thickness of the optical element.

In addition, the optical element may further include (i) a first end face that connects one end of the first surface and one end of the second surface in the second direction and is orthogonal to the second direction, and (ii) a second end face that connects the other end of the first surface and the other end of the second surface in the second direction and is orthogonal to the second direction. Moreover, when viewed from the first direction, a straight line connecting the one end and the other end of the first surface may be sloped relative to the second direction.

With this, when light emitted from the display is reflected by the first surface, it is possible to readily make (i) a direction toward which the light reflected by the first surface travels, and (ii) a direction toward which light reflected by the reflective surface and then exited from the first surface different. Accordingly, reflections due to the light reflected by the first surface can be reduced.

In addition, the display device may further include an infrared light blocking member provided on the first surface side of the optical element.

With this, it is possible to prevent infrared light included in the sunlight etc. from entering the optical element from the first surface. Accordingly, an increase in the temperature in a focal area can be reduced.

In addition, the infrared light blocking member may be an infrared light blocking film.

With this, since the first surface is a convex cylindrical surface, it is possible to readily affix an infrared light blocking member to the first surface. Accordingly, infrared light included in the sunlight etc. can be readily prevented from entering the optical element from the first surface.

In addition, a position of a focal point at which the light exited from the first surface is focused in the first direction and a position of a focal point at which the light exited from the first surface is focused in the second direction may be mutually different in a third direction orthogonal to the first direction and the second direction.

With this, it is possible to further prevent light exited from the first surface from being focused at one point. Accordingly, an increase in the temperature in a focal area can be further reduced.

In addition, in the third direction, the position of the focal point at which the light exited from the first surface is focused in the first direction may be further away from the optical element than the position of the focal point at which the light exited from the first surface is focused in the second direction.

With this, since, in the third direction (direction parallel to the optical axis of the optical element), the position of a focal point at which light exited from the first surface is focused in the first direction is further away from the optical element than the position of a focal point at which light exited from the first surface is focused in the second direction, it is possible to reduce an increase in the dimension of the second surface in the third direction. Accordingly, downsizing of the display device can be achieved.

In addition, a radius of curvature at a center of the second surface may be greater than a radius of curvature at a center of the first surface.

With this, it is possible to reduce an increase in the dimension of the second surface in the third direction (direction parallel to the optical axis of the optical element) which is orthogonal to the first direction and the second direction. Accordingly, a magnification factor (the power of a lens) of the first surface can be sufficiently obtained, while achieving downsizing of the display device.

It should be noted that the embodiments described below each show a specific example of the present disclosure. The numerical values, shapes, materials, structural elements, the arrangement and connection of the structural elements, steps, order of the steps, etc. indicated in the following embodiments are mere examples, and therefore are not intended to limit the scope of the present disclosure. Furthermore, among the structural elements in the embodiments below, those not recited in any one of the independent claims will be described as optional structural elements.

Expressions that indicate orientations relative to two directions, such as parallel to and orthogonal to, are used in the embodiments below, but such expressions do not necessarily indicate exact orientations. For example, when an expression indicates that two directions are parallel to each other, the expression is intended to mean, not only that the two directions are perfectly parallel to each other, but also that the two directions are substantially parallel to each other, unless otherwise specified. In other words, such expressions include, for example, about several percent of differences.

Embodiment 1

FIG. 1 is a diagram illustrating a state in which display device 10 according to Embodiment 1 is provided in a vehicle, FIG. 1 illustrates vehicle 1 and casing 20 in cross-section.

As illustrated in FIG. 1, display device 10 is a device for displaying images. In this embodiment, display device 10 is provided inside the cabin of vehicle 1. For example, display device 10 displays an image captured by a camera that captures an image of the rear of vehicle 1, With this, driver 2 of vehicle 1 can visually check a situation occurring in the rear of vehicle 1 by looking (see the dashed arrow shown in FIG. 1) at display device 10.

Note that display device 10 may display images showing, for example, the speed of vehicle 1, results of detection of an object approaching vehicle 1, and navigation information guiding vehicle 1 from the current location to the destination.

Figure 2:
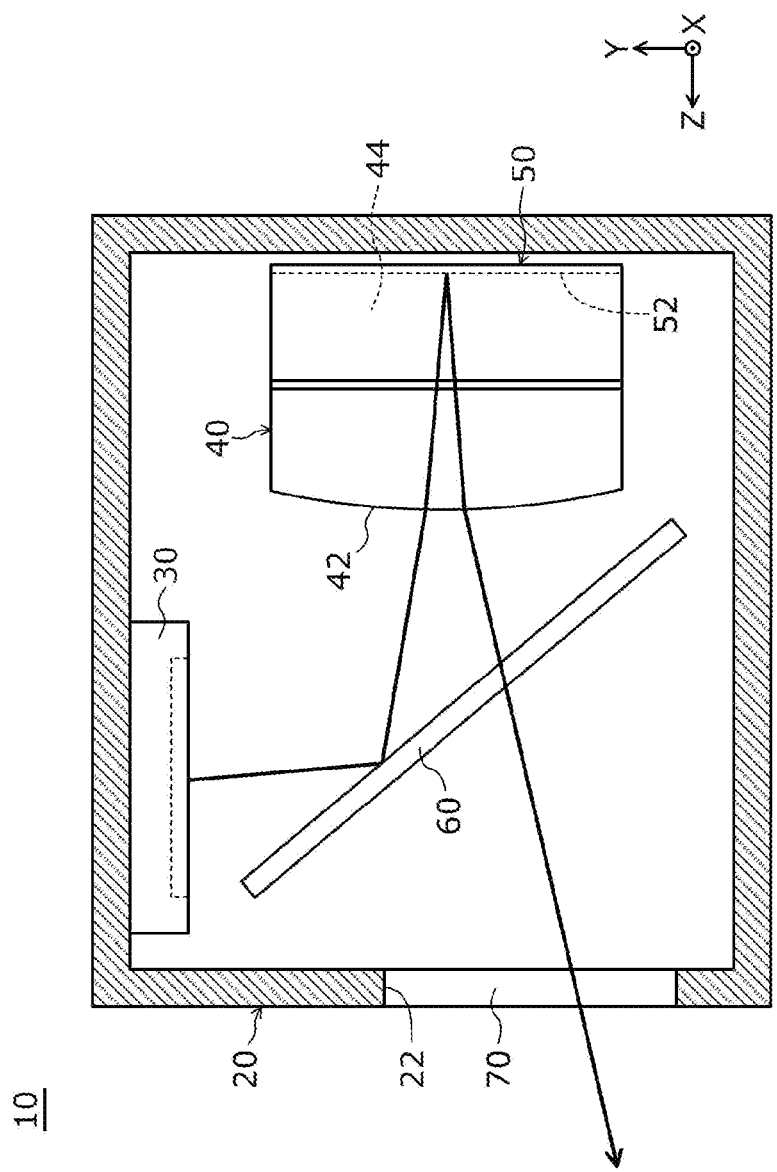
FIG. 2 is a diagram illustrating the display device shown in FIG. 1.

FIG. 2 is a diagram illustrating display device 10 shown in FIG. 1. FIG. 2 illustrates casing 20 in cross-section.

As illustrated in FIG. 2, display device 10 includes casing 20, display 30, optical element 40, reflective member 50, half mirror 60, and light-transmissive cover 70.

Casing 20 accommodates display 30, optical element 40, reflective member 50, and half mirror 60. In this embodiment, casing 20 is suspended from the ceiling of vehicle 1. Casing 20 includes light exiting part 22 for light emitted from display 30 to travel outside casing 20. Light exiting part 22 is a through hole connecting the interior space of casing 20 and the outside space.

Display 30 emits light showing an image. For example, display 30 emits light showing an image captured by a camera that captures an image of the rear of vehicle 1, Display 30 is implemented by including, for example, a liquid crystal display (LCD), an organic electroluminescence (EL) display, or a micro light emitting diode (LED) display.

Figure 3:
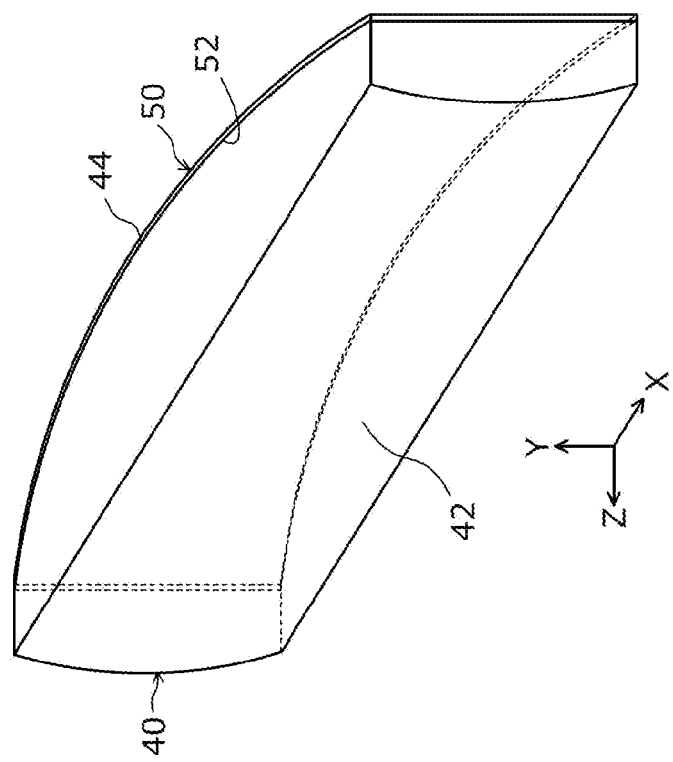
FIG. 3 is a perspective view illustrating an optical element and a reflective member of the display device shown in FIG. 1.
Figure 4:
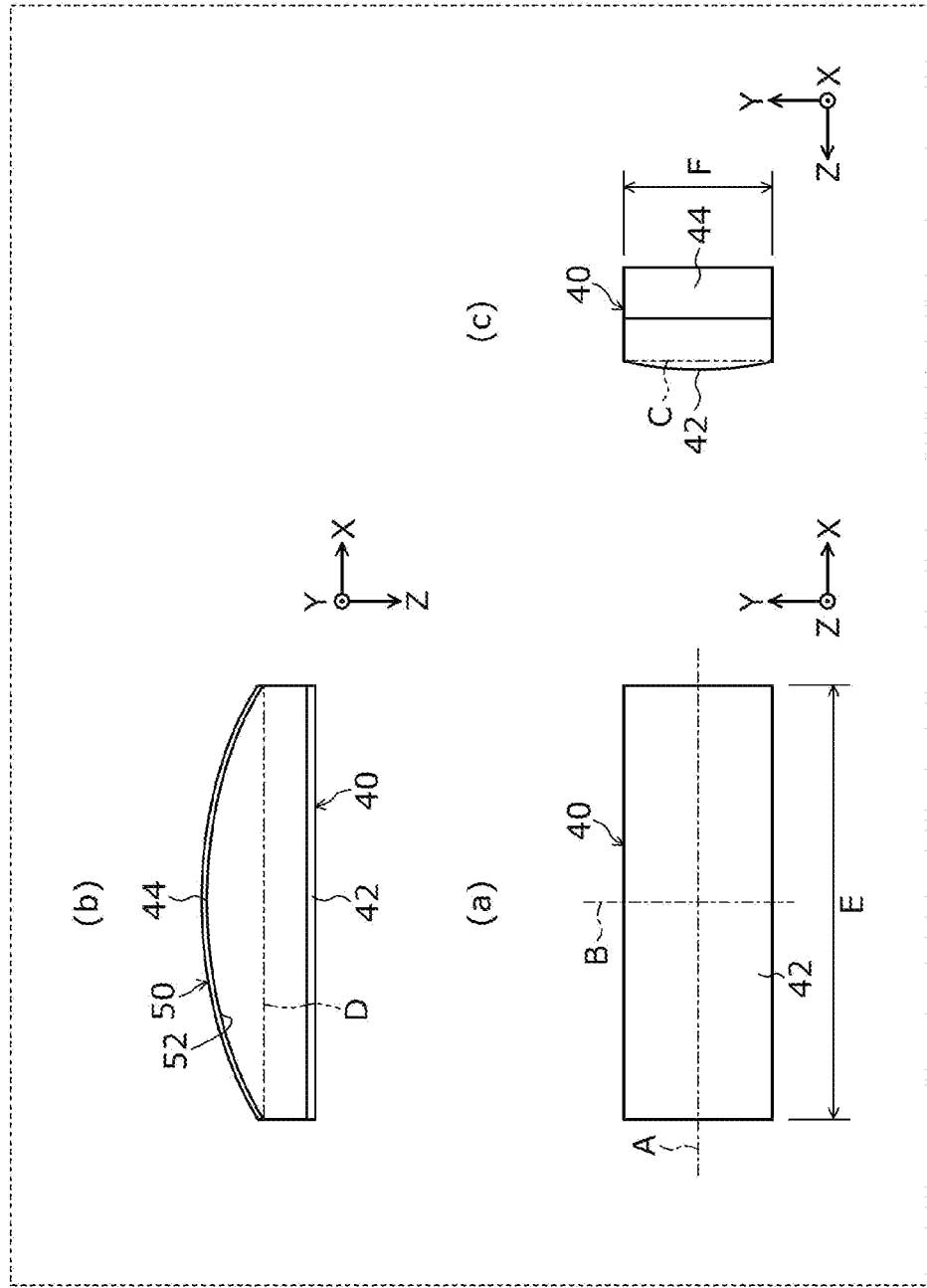
FIG. 4 is a three-view drawing illustrating the optical element and the reflective member shown in FIG. 3.

FIG. 3 is a perspective view illustrating optical element 40 and reflective member 50 of display device 10 shown in FIG. 1. FIG. 4 is a three-view drawing illustrating optical element 40 and reflective member 50 shown in FIG. 3, Part (a) of FIG. 4 is a front view, part (b) of FIG. 4 is a plan view, and part (c) of FIG. 4 is a side view. The illustration of reflective member 50 is omitted from part (c) of FIG. 4.

As illustrated in FIG. 2 through FIG. 4, optical element 40 includes first surface 42 and second surface 44. Optical element 40 allows (i) light emitted from display 30 to enter from first surface 42, and (ii) the light reflected by reflective member 50 provided on second surface 44 to exit from first surface 42 (see the bold arrow shown in FIG. 2). For example, optical element 40 is a lens whose two principal surfaces are convex cylindrical surfaces.

First surface 42 is a convex cylindrical surface whose axial direction is a first direction. Specifically, first surface 42 is a surface along a circumferential direction whose center is axis A (see part (a) of FIG. 4 for its axial direction) which extends in the first direction. The first direction is a direction indicated by the X axis shown in FIG. 2, etc.

First surface 42 allows light emitted from display 30 to enter. Specifically, the light emitted from display 30 enters optical element 40 from first surface 42. In addition, first surface 42 allows the light reflected by reflective member 50 to exit. Specifically, the light reflected by reflective member 50 after the light has entered optical element 40 from first surface 42 is exited from first surface 42 to travel outside optical element 40. As described above, first surface 42 is an entering/exiting surface that allows light to enter and exit.

Second surface 44 is a convex cylindrical surface whose axial direction is a second direction orthogonal to the first direction. Specifically, second surface 44 is a surface along a circumferential direction whose center is axis B (see part (a) of FIG. 4 for its axial direction) which extends in the second direction. The second direction is a direction indicated by the Y axis shown in FIG. 2, etc.

Second surface 44 is a surface opposite first surface 42, and is aligned with first surface 42 in a third direction orthogonal to the first direction and the second direction. In other words, second surface 44 and first surface 42 overlap when viewed from the third direction. The third direction is a direction indicated by the Z axis shown in FIG. 2, etc.

Second surface 44 bulges toward a direction opposite the direction toward which first surface 42 bulges, Specifically, first surface 42 bulges toward one side of the third direction (the positive side of the Z axis direction), and second surface 44 bulges toward the other side of the third direction (the negative side of the Z axis direction).

In this embodiment, when viewed from the first direction, straight line C (see part (c) of FIG. 4) connecting one end of first surface 42 and the other end of first surface 42 in the second direction is parallel to the second direction. Moreover, when viewed from the second direction, straight line D (see part (b) of FIG. 4) connecting one end of second surface 44 and the other end of second surface 44 in the first direction is parallel to the first direction in this embodiment. Note that straight line C need not be parallel to the second direction, and straight line D need not be parallel to the first direction, for example.

Dimension E (see part (a) of FIG. 4) of first surface 42 in the first direction is greater than dimension F (see part (c) of FIG. 4) of second surface 44 in the second direction. In this embodiment, when viewed from the third direction, the dimension of first surface 42 in the second direction is equivalent to dimension F of second surface 44 in the second direction, and the dimension of second surface 44 in the first direction is equivalent to dimension E of first surface 42 in the first direction. Note that, when viewed from the third direction, the dimension of first surface 42 in the second direction need not be equivalent to dimension F of second surface 44 in the second direction, and the dimension of second surface 44 in the first direction need not be equivalent to dimension E of first surface 42 in the first direction, for example.

Reflective member 50 is provided on second surface 44, and has reflective surface 52 that reflects light entered from first surface 42 toward first surface 42. Reflective member 50 is made of, for example, a metal film or resin.

Reflective surface 52 is a concave cylindrical surface whose axial direction is the second direction, Specifically, reflective surface 52 is a surface along a circumference direction whose center is axis B (see part (a) of FIG. 4 for its axial direction) which extends in the second direction. Reflective surface 52 is curved along second surface 44, and recedes toward the other side of the third direction. Reflective surface 52 is in contact with second surface 44.

Reflective surface 52 is aligned with first surface 42 in the third direction. In other words, reflective surface 52 and first surface 42 overlap when viewed from the third direction.

In this embodiment, when viewed from the third direction, the dimension of reflective surface 52 in the first direction is equivalent to dimension E of first surface 42 in the first direction and the dimension of second surface 44 in the first direction, and the dimension of reflective surface 52 in the second direction is equivalent to the dimension of first surface 42 in the second direction and dimension F of second surface 44 in the second direction. Note that, when viewed from the third direction, the dimension of reflective surface 52 in the first direction need not be equivalent to dimension E of first surface 42 in the first direction and the dimension of second surface 44 in the first direction, and the dimension of reflective surface 52 in the second direction need not be equivalent to the dimension of first surface 42 in the second direction and dimension F of second surface 44 in the second direction.

As illustrated in FIG. 2, half mirror 60 reflects light emitted from display 30 toward first surface 42 (see the bold arrow shown in FIG. 2), Specifically, in this embodiment, the light emitted from display 30 enters optical element 40 from first surface 42, after the light is reflected by half mirror 60.

In addition, half mirror 60 allows the light exited from first surface 42 to pass through. The light that has passed through half mirror 60 passes through light-transmissive cover 70 to travel outside casing 20.

Light-transmissive cover 70 is provided over light exiting part 22, and allows light that has passed through half mirror 60 to pass through. Light-transmissive cover 70 is made of, for example, transparent glass or transparent resin.

Figure 5:
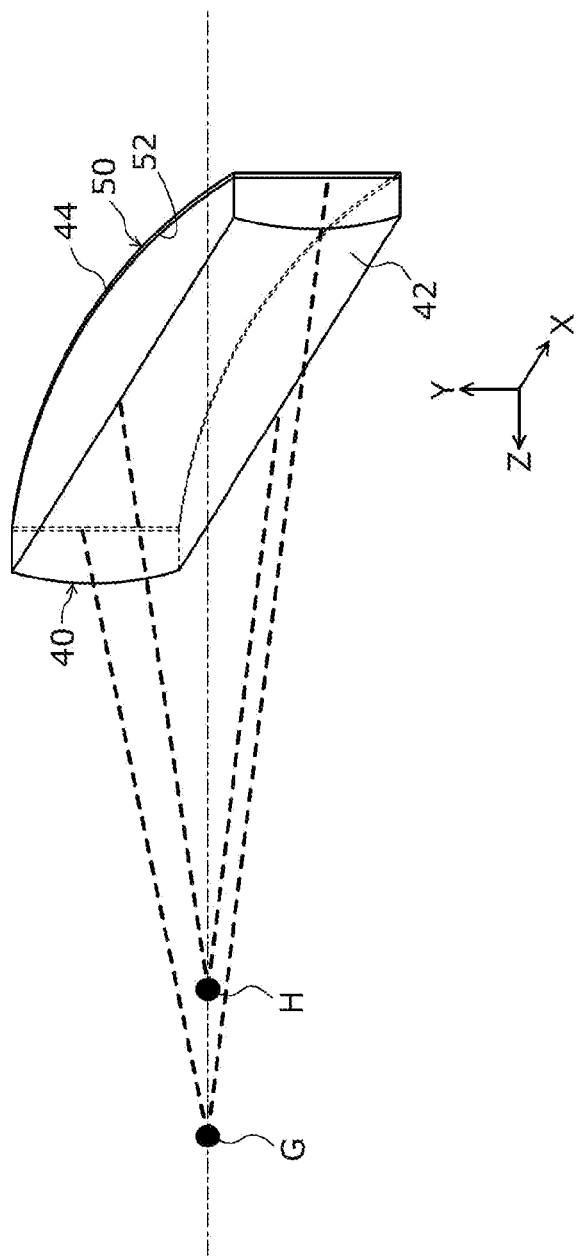
FIG. 5 is a perspective view illustrating positions of focal points at each of which light exited from the optical element shown in FIG. 3 is focused.

FIG. 5 is a perspective view illustrating positions of focal points at each of which light exited from optical element 40 shown in FIG. 3 is focused. FIG. 5 illustrates positions of focal points on the central axis (denoted by the dash-dotted line) of optical element 40.

As illustrated in FIG. 5, the position of focal point G at which light reflected by reflective surface 52 and then exited from first surface 42 is focused in the first direction and the position of focal point H at which light exited from first surface 42 is focused in the second direction are mutually different in the third direction.

In this embodiment, focal point G is located further away from optical element 40 than focal point H is located. In other words, in the third direction, the position of focal point G at which light exited from first surface 42 is focused in the first direction is further away from optical element 40 than the position of focal point H at which light exited from first surface 42 is focused in the second direction in this embodiment, Note that focal point G may be located closer to optical element 40 than focal point H is located, for example.

For example, the curvature of first surface 42, the curvature of second surface 44, the space between first surface 42 and second surface 44, etc. can determine the position of focal point G and the position of focal point H.

Note that, since first surface 42 is a convex cylindrical surface whose axial direction is the first direction (parallel to the X axis), light exited from first surface 42 passes through focal point H, and is focused in the shape of an ellipse having the long axis that is a line segment parallel to the X axis. Likewise, since second surface 44 is a convex cylindrical surface whose axial direction is the second direction (parallel to the Y axis) and reflective surface 52 is a concave cylindrical surface whose axial direction is the second direction (parallel to the Y axis), light reflected by reflective surface 52 and then exited from first surface 42 passes through focal point G, and is focused in the shape of an ellipse having the long axis that is a line segment parallel to the Y axis. With this, since light is not focused at one point like a spherical lens, it is possible to reduce an increase in the temperature in a focal area.

Hereinbefore, display device 10 according to Embodiment 1 has been described.

Display device 10 according to Embodiment 1 includes: display 30; optical element 40 including first surface 42 and second surface 44; and reflective member 50 provided on second surface 44. First surface 42 is a convex cylindrical surface whose axial direction is a first direction, allows light emitted from display 30 to enter, and allows the light reflected by reflective member 50 to exit. Second surface 44 is a convex cylindrical surface whose axial direction is a second direction orthogonal to the first direction. Reflective member 50 includes reflective surface 52 that reflects the light that has entered from first surface 42 toward first surface 42. Reflective surface 52 is a concave cylindrical surface whose axial direction is the second direction.

With this, since (i) first surface 42 is a convex cylindrical surface whose axial direction is the first direction, and (ii) reflective surface 52 is a concave cylindrical surface whose axial direction is the second direction orthogonal to the first direction, it is possible to prevent light that has entered from first surface 42, has reflected by reflective surface 52, and has exited from first surface 42 from being focused at one point. Accordingly, an increase in the temperature in a focal area can be reduced.

In addition, display device 10 according to Embodiment 1 further includes half mirror 60 that reflects the light emitted from display 30 toward first surface 42, and allows the light exited from first surface 42 to pass through.

With this, an optical path length can be increased by allowing light emitted by display 30 to enter from first surface 42, after the light is reflected by half mirror 60. Accordingly, driver 2 can visually check an image displayed on display 30 at a greater distance.

In addition, in display device 10 according to Embodiment 1, dimension E of first surface 42 in the first direction is greater than dimension F of second surface 44 in the second direction.

With this, it is possible to readily display a long-shaped image, while reducing an increase in the thickness of optical element 40.

In addition, in display device 10 according to Embodiment 1, the position of focal point G at which the light exited from first surface 42 is focused in the first direction and the position of focal point H at which the light exited from first surface 42 is focused in the second direction are different in a third direction orthogonal to the first direction and the second direction.

With this, it is possible to further prevent light exited from first surface 42 from being focused at one point. Accordingly, an increase in the temperature in a focal area can be further reduced.

In addition, in display device 10 according to Embodiment 1, in the third direction, the position of focal point G at which the light exited from first surface 42 is focused in the first direction is further away from optical element 40 than the position of focal point H at which the light exited from first surface 42 is focused in the second direction.

With this, since, in the third direction (direction parallel to the optical axis of optical element 40), the position of focal point G at which light exited from first surface 42 is focused in the first direction is further away from optical element 40 than the position of focal point H at which light exited from first surface 42 is focused in the second direction, it is possible to reduce an increase in the dimension of second surface 44 in the third direction. Accordingly, downsizing of display device 10 can be achieved.

Embodiment 2

Figure 6:
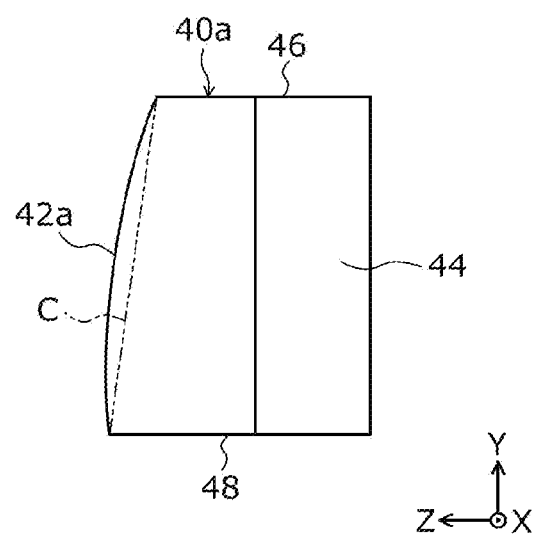
FIG. 6 is a diagram illustrating an optical element included in a display device according Embodiment 2.

FIG. 6 is a diagram illustrating optical element 40a included in a display device according Embodiment 2. The display device according to Embodiment 2 is mainly different from display device 10 in that the display device includes optical element 40a different from optical element 40.

As illustrated in FIG. 6, optical element 40a is mainly different from optical element 40 in that optical element 40a substantially has a wedge shape when viewed from the first direction.

Optical element 40a further includes (i) first end face 46 that connects one end of first surface 42a and one end of second surface 44 in the second direction, and is orthogonal to the second direction, and (ii) second end face 48 that connects the other end of first surface 42a and the other end of second surface 44 in the second direction, and is orthogonal to the second direction. In addition, straight line C connecting the one end of first surface 42a and the other end of first surface 42a is sloped relative to the second direction.

Hereinbefore, the display device according to Embodiment 2 has been described.

In the display device according to Embodiment 2, optical element 40a further includes (i) first end face 46 that connects one end of first surface 42a and one end of second surface 44 in the second direction and is orthogonal to the second direction, and (ii) second end face 48 that connects the other end of first surface 42a and the other end of second surface 44 in the second direction and is orthogonal to the second direction. Moreover, when viewed from the first direction, straight line C connecting the one end and the other end of first surface 42a is sloped relative to the second direction.

With this, when light emitted from display 30 is reflected by first surface 42a, it is possible to readily make (i) a direction toward which the light reflected by first surface 42a travels, and (ii) a direction toward which light reflected by reflective surface 52 and then exited from first surface 42a travels different. Accordingly, reflections due to the light reflected by first surface 42a can be reduced.

Embodiment 3

Figure 7:
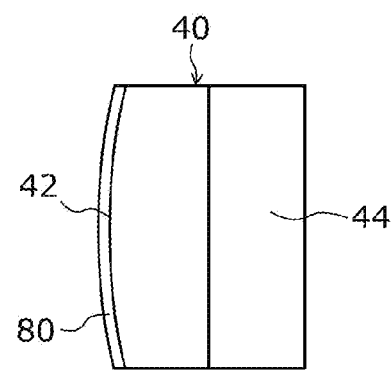
FIG. 7 is a diagram illustrating an optical element etc. included in a display device according Embodiment 3.

FIG. 7 is a diagram illustrating optical element 40 etc. included in a display device according Embodiment 3, The display device according to Embodiment 3 is mainly different from display device 10 in that the display device further includes infrared light blocking member 80.

As illustrated in FIG. 7, infrared light blocking member 80 is disposed on the first surface 42 side of optical element 40. In this embodiment, infrared light blocking member 80 is an infrared light blocking film, and is affixed to first surface 42, Note that infrared light blocking member 80 need not be an infrared light blocking film, and may be disposed in a position away from first surface 42.

Hereinbefore, the display device according to Embodiment 3 has been described.

The display device according to Embodiment 3 further includes infrared light blocking member 80 provided on the first surface 42 side of optical element 40.

With this, it is possible to prevent infrared light included in the sunlight etc. from entering optical element 40 from first surface 42, Accordingly, an increase in the temperature in a focal area can be further reduced.

In addition, infrared light blocking member 80 is an infrared light blocking film.

With this, since first surface 42 is a convex cylindrical surface, it is possible to readily affix infrared light blocking member 80 to first surface 42, Accordingly, infrared light included in the sunlight etc. can be readily prevented from entering optical element 40 from first surface 42.

Embodiment 4

Figure 8:
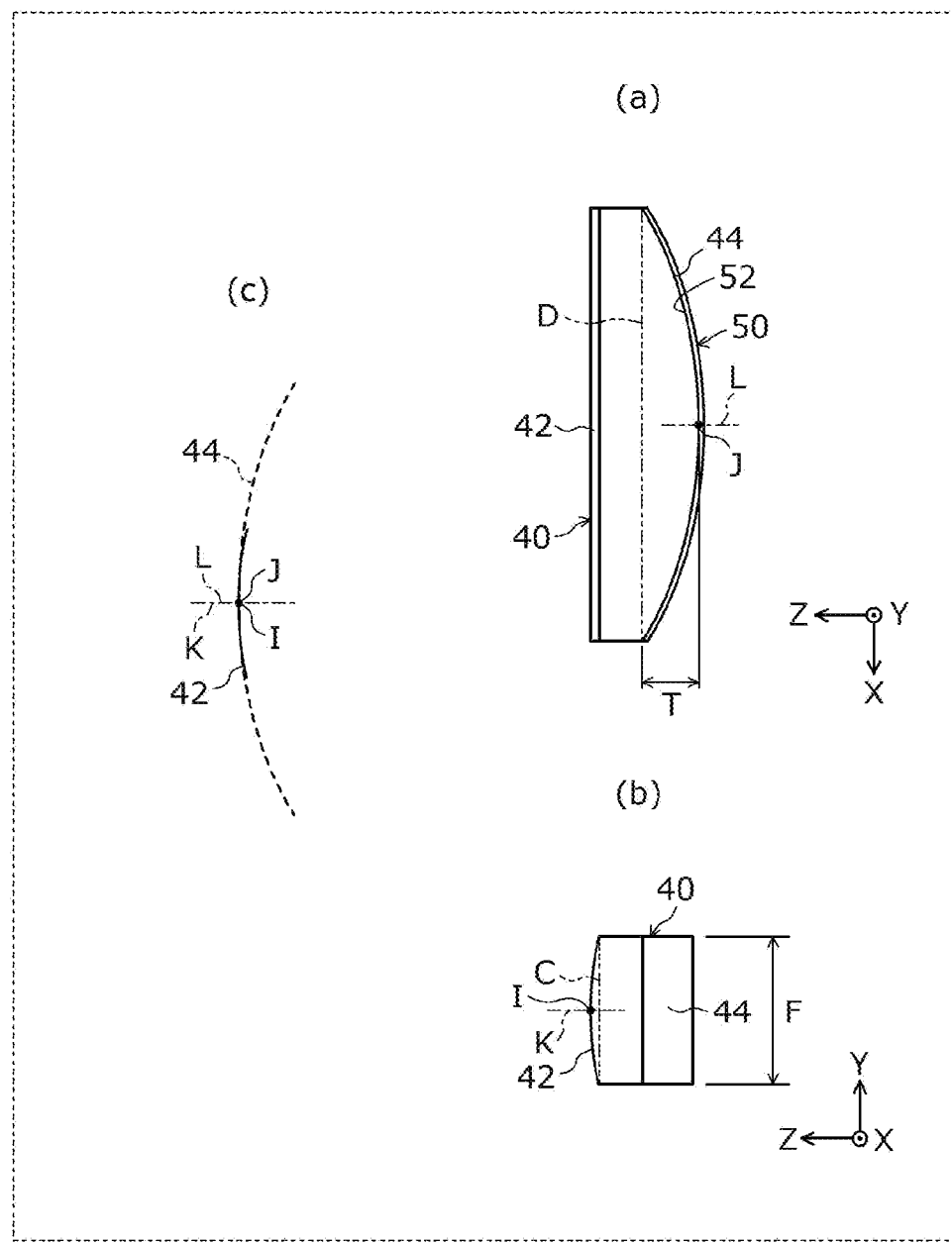
FIG. 8 is a diagram illustrating an optical element included in a display device according Embodiment 4.

FIG. 8 is a diagram illustrating optical element 40 included in a display device according Embodiment 4. Part (a) of FIG. 8 is a plan view of optical element 40, part (b) of FIG. 8 is a side view of optical element 40, and part (c) of FIG. 8 is a diagram in which center I of first surface 42 of optical element 40 and center J of second surface 44 of optical element 40 overlap.

Second surface 44 in the plan view illustrated in part (a) of FIG. 8 is denoted by the dashed line in part (c) of FIG. 8, and first surface 42 in the side view illustrated in part (b) of FIG. 8 is denoted by the solid line in part (c) of FIG. 8. Part (c) of FIG. 8 illustrates second surface 44 and first surface 42 in a state in which center J of second surface 44 and center I of first surface 42 meet. Center J of second surface 44 is the center of second surface 44 in the second direction rotation. Center I of first surface 42 is the center of first surface 42 in the first direction rotation. Part (c) of FIG. 8 illustrates a state in which (i) straight line L that passes through center J of second surface 44 and is orthogonal to a line tangent to second surface 44 when viewed from the second direction, and (ii) straight line K that passes through center I of first surface 42 and is orthogonal to a line tangent to first surface 42 when viewed from the first direction overlap.

Here, in Embodiment 4, optical element 40 is configured such that a radius of curvature at center J of second surface 44 is greater than a radius of curvature at center I of first surface 42, as illustrated in part (c) of FIG. 8. In other words, the radius of curvature at center J of second surface 44 is greater than the radius of curvature at center I of first surface 42. Reflective surface 52 has the same radius of curvature as the radius of curvature of second surface 44, and the radius of curvature at the center of reflective surface 52 is greater than the radius of curvature at center I of first surface 42.

For example, when second surface 44 is a curved surface having a single radius of curvature and first surface 42 is a curved surface having a single radius of curvature, the radius of curvature of second surface 44 is greater than the radius of curvature of first surface 42. In this case, the radius of curvature of reflective surface 52 is also greater than the radius of curvature of first surface 42, for example.

Moreover, for example, when second surface 44 is an aspherical, curved surface and first surface 42 is an aspherical, curved surface, the radius of curvature of a curved surface including center J of second surface 44 is greater than the radius of curvature of a curved surface including center I of first surface 42. In this case, the radius of curvature of a curved surface including the center of reflective surface 52 is also greater than the radius of curvature of a curved surface including center I of first surface 42, for example, Note that the radius of curvature of the curved surface including center I of first surface 42 as described above is defined as the radius of a circle that passes through three points including center I and two points in the vicinity of center I which are located in the front and the back of center I. Moreover, the radius of curvature of the curved surface including center J of second surface 44 is defined as the radius of a circle that passes through three points including center J and two points in the vicinity of center J which are located in the front and the back of center J. Furthermore, the radius of curvature of the curved surface including the center of reflective surface 52 is defined as the radius of a circle that passes through three points including the center and two points in the vicinity of the center which are located in the front and the back of the center.

Hereinbefore, the display device according to Embodiment 4 has been described.

In the display device according to Embodiment 4, the radius of curvature at center J of second surface 44 is greater than the radius of curvature at center I of first surface 42.

With this, it is possible to reduce an increase in dimension T of second surface 44 in the third direction (direction parallel to the optical axis of optical element 40) which is orthogonal to the first direction and the second direction. Accordingly, a magnification factor (the power of a lens) of first surface 42 can be sufficiently obtained, while achieving downsizing of the display device.

Other Embodiments

Hereinbefore, a display device according to one or more embodiments of the present disclosure have been described based on these embodiments; however, the present disclosure is not limited to these embodiments. Without departing from the scope of the present disclosure, various modifications which may be conceived by a person skilled in the art, and embodiments achieved by combining structural elements in different embodiments may be encompassed within the scope of one or more aspects of the present disclosure.

The above-described embodiments have described a case in which display device 10 includes half mirror 60; however, the embodiments are not limited to the foregoing case. For example, display device 10 need not include half mirror 60. In this case, display 30 is disposed facing first surface 42 such that light emitted from display 30 is directly incident on first surface 42.

In addition, the above-described embodiments have described a case in which the dimension of first surface 42 in the first direction is greater than the dimension of second surface 44 in the second direction; however, the embodiments are not limited to the foregoing case. For example, the dimension of first surface 42 in the first direction may be smaller than the dimension of second surface 44 in the second direction, or may be equivalent to the dimension of second surface 44 in the second direction.

While various embodiments have been described herein above, it is to be appreciated that various changes in form and detail may be made without departing from the spirit and scope of the present disclosure as presently or hereafter claimed.

Further Information about Technical Background to this Application

The present application is based on and claims priority of Japanese Patent Application No. 2021-108849 filed on Jun. 30, 2021, and Japanese Patent Application No. 2021-196547 filed on Dec. 2, 2021.

INDUSTRIAL APPLICABILITY

The present disclosure can be used for display devices and the like for displaying images.

The invention claimed is:

1. A display device comprising:
    a display;
    an optical element including a first surface and a second surface; and
    a reflective member provided on the second surface, wherein
    the first surface is a convex cylindrical surface along a circumferential direction whose center is an axis which extends in a first direction, allows light emitted from the display to enter, and allows the light reflected by the reflective member to exit,
    the second surface is a convex cylindrical surface along a circumferential direction whose center is an axis which extends in a second direction orthogonal to the first direction,
    the reflective member includes a reflective surface that reflects the light that has entered from the first surface toward the first surface, and
    the reflective surface is a concave cylindrical surface whose axial direction is the second direction.

2. The display device according to claim 1, further comprising:
    a half mirror that reflects the light emitted from the display toward the first surface, and allows the light exited from the first surface to pass through.

3. The display device according to claim 1, wherein
    a dimension of the first surface in the first direction is greater than a dimension of the second surface in the second direction.

4. The display device according to claim 1, wherein
    the optical element further includes (i) a first end face that connects one end of the first surface and one end of the second surface in the second direction and is orthogonal to the second direction, and (ii) a second end face that connects an other end of the first surface and an other end of the second surface in the second direction and is orthogonal to the second direction, and
    when viewed from the first direction, a straight line connecting the one end and the other end of the first surface is sloped relative to the second direction.

5. The display device according to claim 1, further comprising:
    an infrared light blocking member provided on the first surface side of the optical element.

6. The display device according to claim 5, wherein
    the infrared light blocking member is an infrared light blocking film.

7. The display device according to claim 1, wherein
    a position of a focal point at which the light exited from the first surface is focused in the first direction and a position of a focal point at which the light exited from the first surface is focused in the second direction are mutually different in a third direction orthogonal to the first direction and the second direction.

8. The display device according to claim 7, wherein
    in the third direction, the position of the focal point at which the light exited from the first surface is focused in the first direction is further away from the optical element than the position of the focal point at which the light exited from the first surface is focused in the second direction.

9. The display device according to claim 1, wherein
    a radius of curvature at a center of the second surface is greater than a radius of curvature at a center of the first surface.

* * * * *